United States Patent [19]

Maistre

[11] 4,328,272

[45] May 4, 1982

[54] REINFORCED LAMINATED STRUCTURE

[75] Inventor: Michel Maistre, Bordeaux, France

[73] Assignee: Societe Europeenne de Propulsion, Puteaux, France

[21] Appl. No.: 109,119

[22] Filed: Jan. 2, 1980

[30] Foreign Application Priority Data

Jan. 9, 1979 [FR] France ................. 79 00424

[51] Int. Cl.³ ............................................. B32B 5/12
[52] U.S. Cl. .................................. 428/105; 428/114; 428/119; 428/175; 428/225; 428/282; 428/284; 428/294; 428/367; 428/368; 428/902
[58] Field of Search .......... 428/36, 105, 175, 109–114, 428/119, 367, 368, 225, 282, 284, 294, 902

[56] References Cited

U.S. PATENT DOCUMENTS

| | | | |
|---|---|---|---|
| 3,297,513 | 1/1967 | Robinson | 428/111 X |
| 3,577,294 | 5/1971 | David | 156/173 |
| 3,949,126 | 4/1976 | Crawford | 428/113 |
| 4,059,468 | 11/1977 | Bouillon | 428/367 X |
| 4,168,337 | 9/1979 | Maistre | 428/107 X |

FOREIGN PATENT DOCUMENTS

| | | |
|---|---|---|
| 2315562 | 1/1977 | France . |
| 2276916 | 3/1977 | France . |
| 2398705 | 2/1979 | France . |
| 2022160 | 12/1979 | United Kingdom ............... 428/105 |

Primary Examiner—George F. Lesmes
Assistant Examiner—Alexander S. Thomas
Attorney, Agent, or Firm—Staas & Halsey

[57] ABSTRACT

The structure comprises a stack of superimposed layers of bi-dimensional reinforcing material and rectilinear reinforcing elements which traverse said stack through and through and which are arranged in at least two directions different from each other, each reinforcing element being at an angle with the plane that is tangential to the layers it traverses.

7 Claims, 3 Drawing Figures

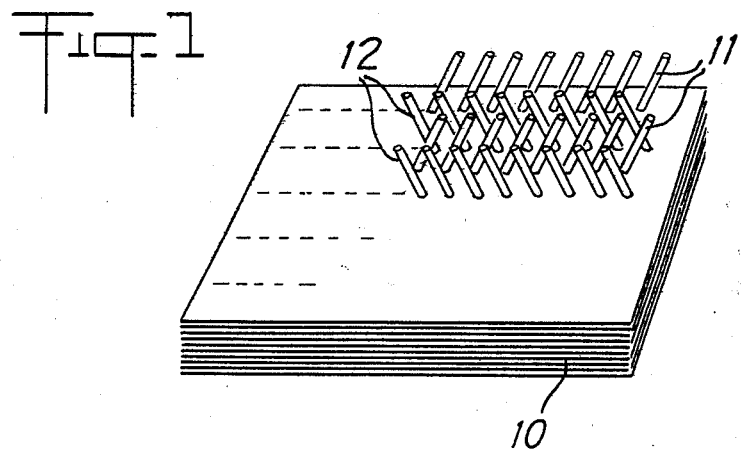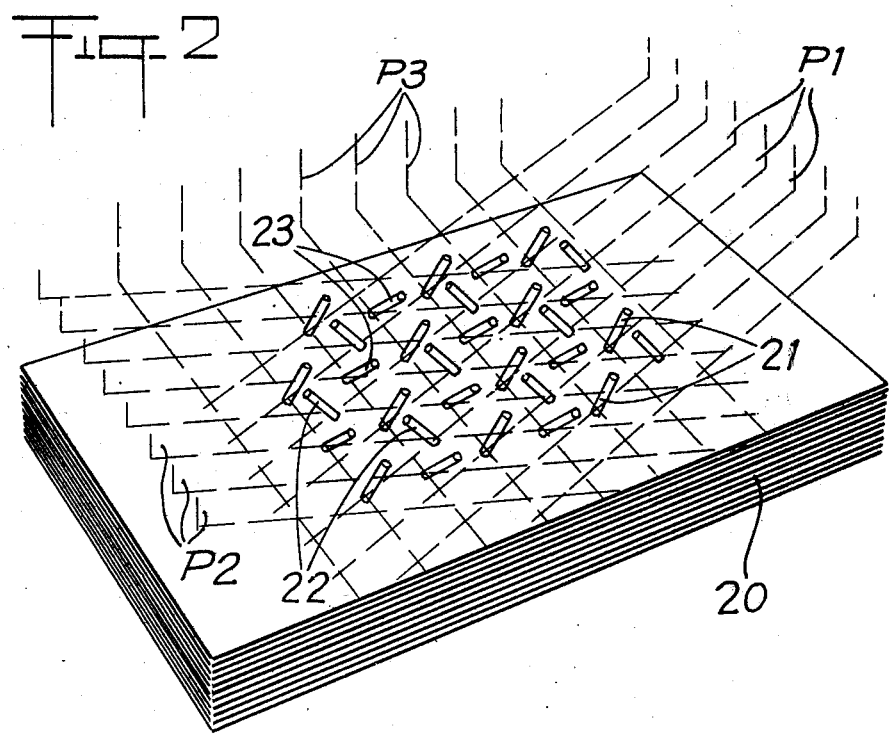

REINFORCED LAMINATED STRUCTURE

BACKGROUND AND SUMMARY OF THE INVENTION

The present invention concerns a reinforced laminated structure for composite material, which structure comprises a stack of superimposed layers of bi-dimensional reinforcing material and rectilinear reinforcing elements traversing said stack through and through.

The field of application of the invention is that of tridimensional reinforcement structures used in the manufacture of composite materials. These are obtained by filling the structures with a matrix. Such composite materials are intended to be used in particular in the production of parts meant to be subjected to special conditions such as strong mechanical or thermal stresses.

Laminated reinforcement structures are constituted by superimposed layers of bi-dimensional type reinforcing material such as fabrics, unidirectional sheets, felts, papers, etc. . . . The laminated composite materials formed with such structures have a defect in common, that is breakage through delamination due to the weakness of the bondings between the layers of materials.

In order to overcome this disadvantage, it was proposed to reinforce laminated structures by adding reinforcing elements thereto in a direction perpendicular to the plane of the layers, which elements traverse the stack through and through. A tridimensional-type reinforced laminated structure is thus obtained. The reinforcing elements are either wires, or small rigid rods which can also comprise a fibrous reinforcement. The whole assembly of reinforcement elements forms a bundle of virtually rectilinear reinforcing elements, which are parallel together and distributed either in regular manner or at random with respect to the surface of layers.

In practice, it was noted that such an arrangement of transverse reinforcement elements only brings but a small protection against delamination because of the possibility for part of the stacked layers to slide along the bundle of reinforcing elements and to come apart from the rest of the stack. Although this coming apart does not necessarily lead to a complete breakage as with the delamination of a non-reinforced laminated structure, it is nevertheless a serious disadvantage which shows that this particular solution is not perfect yet.

It is the aim of the invention to propose a reinforced laminated structure permitting to remove any subsequent possibility of decohesion of the stacked layers of the composite material.

This aim is reached because, according to the invention, the reinforcement elements are arranged in at least two different directions, each reinforcing element being at an angle with the plane that is tangential to the layers it traverses, and at least one of said directions being at an angle with the perpendicular to the traversed layers.

According to that arrangement of the reinforcing elements, the reinforcing elements found in every part of the stack, are oriented differently with respect to one another, thereby constituting a locking for the contacting layers.

This result may be obtained by an arrangement at random of the reinforcing elements both in their distribution with respect to the surface of the layers and in their orientation with respect to the planes tangential to the layers.

DESCRIPTION OF THE PREFERRED EMBODIMENT

Figure 3:
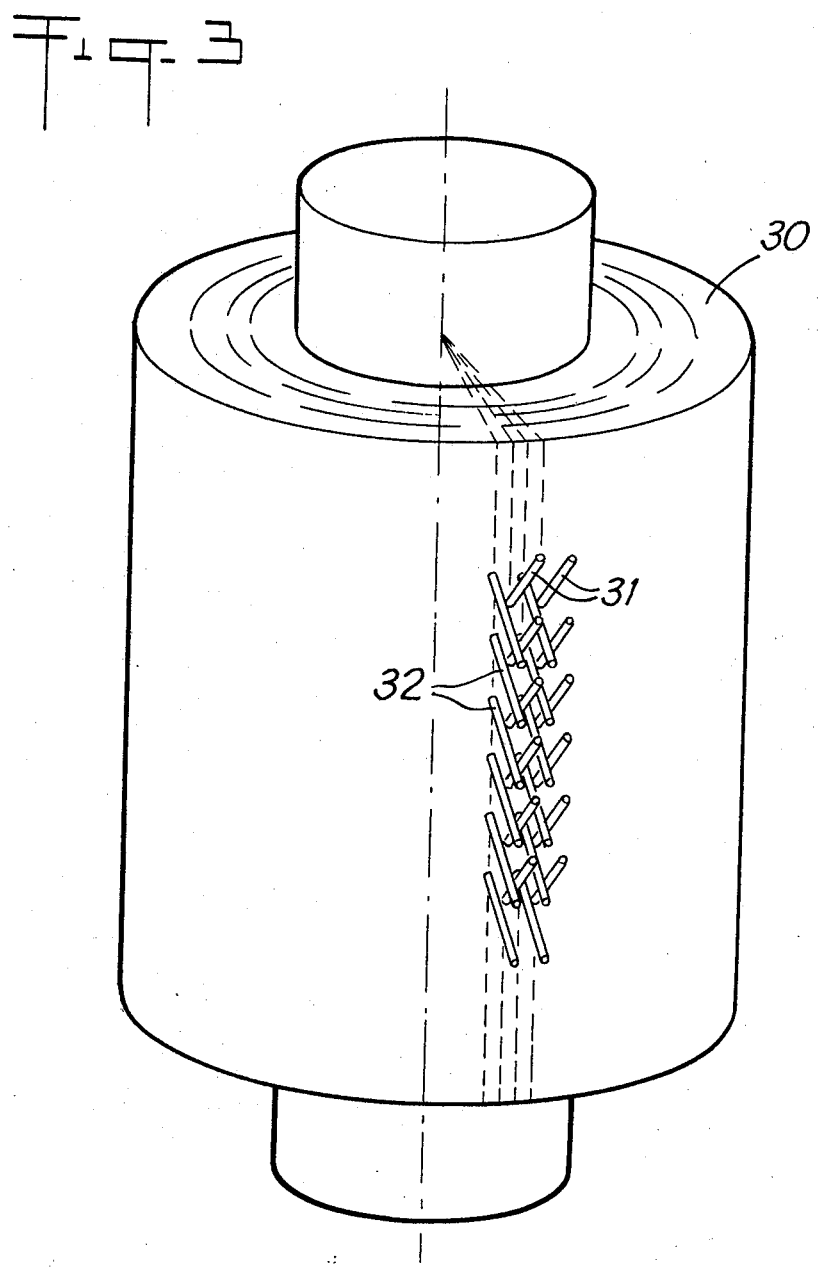

However, according to one preferred embodiment of the invention, the reinforcing elements constitute at least two imbricate groups of reinforcing elements regularly distributed in the space, the direction of the elements of each group being throughout the whole volume of the stack, different from that of the elements of the or each other group.

In the case of plane layers, each group may be formed of elements placed in parallel and equidistant rows, each row being formed of parallel and equidistant elements.

In the case of layers arranged along co-axial surfaces of revolution, such as cylinders for example, the reinforcing elements in each group are preferably arranged in rows of parallel and equidistant elements, said rows being arranged along meridian planes which are angularly regularly distributed, the rows of elements of the different groups being arranged in alternate meridian planes. The elements of at least one group are not radial.

In the case of annular structures, it is considered in the present specification that all the elements which make the same angle with respect to the axis of the structure and lie in meridian planes have the same direction though they are not all parallel to each other.

As indicated hereinabove, the reinforcing elements are oriented in at least two different directions each being at an angle with the planes tangential to the layers traversed by the said elements. In the case where several groups are provided with the elements in each group being parallel to each other, it is preferable that the elements of at least one group form with the plane tangential to the layers that they traverse an angle greater than a minimal value in order to prevent, efficiently, the superimposed layers from sliding off one another. It is equally preferable that at least two directions of groups of elements form together an angle greater than a minimal value, in order also to avoid the layers separating one from the other. The minimal value in either case may be selected to be about 20°.

The following examples illustrate nonrestrictively several embodiments of a structure according to the invention, reference being made to the accompanying drawings wherein FIGS. 1 to 3 show diagrammatical perspective views of such embodiments.

EXAMPLE 1

Layers 10 of woven carbon material stacked parallely to a plane surface are pierced through and through with two bundles of rigid and rectilinear rods 11, 12 (FIG. 1). Said rods are 1 mm in diameter and constituted of carbon fibres bonded together with a carbonizable resin. Each bundle contains a plurality of rods parallel together and distributed in a plurality of rows disposed in planes parallel to one another and spaced out, in regular manner, at intervals of 8 mm.

The rods in each row are parallel together and regularly spaced, their axes being 4 mm apart. The planes defining the rows of two bundles are parallel together and regularly alternated so that each row in each bundle is intercalated half way between two adjacent rows of the other bundle. All the planes of the rows are perpendicular to the plane surface of the stack of material. The directions of the two bundles, defined by the directions of the rods composing them, respectively form an angle of 40° on either sides of the perpendicular to the surface of the stack of material.

In the reinforced laminated structure produced this way, each dm2 of material is pierced through by 240 rods from each of the two reinforcing bundles, the whole of these rods representing 4.9% of the total volume of the structure.

Said structure is thereafter converted into composite material of the carbon-carbon type by any one of the known methods for producing a carbon matrix embedded in a carbon structure.

Amongst these known methods are the one consisting in impregnating the structure with a carbonizable resin, and the one consisting in depositing pyrolytic carbon by chemical vapor deposition. Such methods are described in French Pat. No. 2,276,916.

Whatever the method used, there never is the slightest delamination, when using such a reinforced structure at the start, whereas this defect, which is often latent, frequently occurs during these treatments whenever these are applied to a non-reinforced laminated structure which is reinforced only by one bundle of parallel rods.

EXAMPLE 2

Layers 20 of carbon felt stacked in parallel to a plane surface are pierced through and through with three bundles of rigid and rectilinear rods 21, 22, 23 (FIG. 2).

Said rods are 1 mm in diameter and are constituted of carbon fibres bonded together with a carbonizable resin. Each bundle is composed of a plurality of rods parallel together and distributed in a plurality of rows arranged according to planes P1, P2 and P3, and regularly spaced at intervals of 12.5 mm. The planes defining the rows of the three bundles are perpendicular to the plane surface of the stack of felts and form angles of 60° with respect to one another. The directions of the three bundles, defined by the directions of the rods composing them each form an angle of 46.5° with respect to the surface of the stack of felts, and form between them angles of 73.7°. In the reinforced laminated structure produced this way, each dm2 of material is pierced through by 115 rods of each one of the three reinforcing bundles, all these rods representing 3.8% of the total volume of the structure.

Said structure confers an excellent cohesion to the carbon-carbon composite including said structure as reinforcement. No cracks or delamination occurs when the composite is subjected to very severe thermomechanical stresses such as those suffered by the materials making up the nozzles of solid propellant rockets; this being not the case with the composites of a similar nature but with only one bundle of rods parallel together.

EXAMPLE 3

A continuous strip 30 of carbon fabric is wound in superimposed coils around a cylindrical mandrel 100 mm in diameter so that the final diameter can reach 200 mm. Said cylindrical stack of material is then pierced right through the whole of its thickness by two groups of rigid and rectilinear rods 31, 32 (FIG. 3).

Said rods of 1 mm of diameter are composed of unidirectional carbon fibres. Each group is composed of 60 rows of rods arranged according to meridian planes regularly offset by 6°, the rows of one group being offset by 3° with respect to the rows of the other group so that they are regularly staggered. Within each group the rods are parallel together and regularly spaced at intervals of 4 mm between their axes. The rows of each group form respectively an angle of 40° on either side of the local perpendicular to the surface of the material.

In the reinforced laminated structure produced this way, the amount of the rods traversing 1 dm2 of material on the one hand, and the volumic rod content of the structure on the other hand, are variable depending on the level inside the stack. These values reduce progressively from the inside diameter of the stack to the outside diameter. Thus, each dm2 of material is pierced through by 366 rods of each group on the level of the internal diameter of the stack and only by half that number, i.e. 183 rods of each group on the external surface. In parallel, the rod contents have reduced progressively from 7.5% to 3.75%.

Such an axi-symmetrical structure is especially adapted to the production of annular pieces in refractory composites required to withstand such very severe thermal and mechanical stresses as the nozzles of solid propellant rockets do.

EXAMPLE 4

A continuous strip of felt is wound in superimposed coils on a cylindrical mandrel of 100 mm diameter until a final diameter of 200 mm is obtained. This cylindrical stack of felt is then pierced through its entire thickness by two groups of rigid and rectilinear rods in the same way as described in the preceding example.

The rods have a diameter of 2 mm and are composed of unidirectional carbon fibres. Each group is composed of 60 rows of rods arranged according to meridian planes regularly offset by 6°, the rows of one group being offset by 3° with respect to the rows of the other groups so that they are regularly staggered. Within each row the rods are parallel together and regularly spaced at intervals of 3 mm between their axes. The rods of each group respectively form an angle of 40° on either side of the local perpendicular to the surface of the material.

In the laminated structure produced this way, the proportion of rods decreases progressively from 40% at the level of the internal diameter to 20% at the level of the external diameter. Each dm2 of felt is pierced through by 488 rods of each group at the level of the internal diameter and by 244 at the level of the external diameter.

Of course, the foregoing examples are in no way restrictive and other embodiments of a structure according to the invention may be envisaged without departing from the scope of protection defined by the accompanying claims.

It will be noted on this point that other materials than carbon may be used to produce the superimposed layers and/or the reinforcing elements, especially according to the application proposed for the structure.

What is claimed is:

1. A reinforced laminated structure for composite materials, which structure consists of a stack of superimposed sheets of bi-dimensional reinforcing material and rectilinear reinforcing elements which traverse said stack through and through, and comprising at least two imbricate groups of rods rigid regularly spacely distributed with the groups arranged in at least two different directions; each reinforcing element being at an angle with the plane that is tangential to the sheets it traverses and at least one of said directions being at an angle with the perpendicular to the traversed sheets, whereby said rods prevent said superimposed sheets from delemination.

2. A structure as claimed in claim 1, wherein the rods in each group have a direction which is throughout the whole volume of the stack different from that of the rods of each other group.

3. A structure as claimed in claim 2, wherein the directions of the rods of at least two different groups are at an angle with the perpendicular to said sheets on either side of said perpendicular.

4. A reinforced laminated structure for composite materials, which structure consists of a stack of superimposed plane sheets of bi-dimensional reinforcing material and rectilinear rigid reinforcing rods each traversing said stack through and through, said rods constituting at least two imbricate groups, with the rods in each group being regularly spacely distributed and having a same direction which is throughout the whole volume of the stack different from that of the rods of each other group, the rods of at least one group having a direction which is at an angle with the perpendicular to the sheets, whereby said rods prevent said superimposed sheets from delemination.

5. A structure as claimed in claim 4, wherein the elements in each group are arranged in rows parallel to each other, the rows of elements of different groups being alternatively arranged.

6. A reinforced laminated structure for composite materials, which structure consists of a stack of superimposed sheets of bi-dimensional reinforcing material arranged on coaxial surfaces of revolution and rectilinear rigid reinforcing rods each traversing said stack through and through, said rods constituting at least two imbricate groups with the rods of each group being arranged along meridian planes, and the rods of at least one group being at an angle with the perpendicular to the traversed sheets, whereby said rods prevent said superimposed sheets from delemination.

7. A structure as claimed in claim 6, wherein the rods constitute at least two imbricate groups with the elements of each group being arranged in rows extending along meridian planes, the rows of elements of the different groups being arranged in alternate meridian planes.

* * * * *